US011533708B2

(12) United States Patent
Chen et al.

(10) Patent No.: US 11,533,708 B2
(45) Date of Patent: Dec. 20, 2022

(54) APPARATUSES AND METHODS FOR NETWORK SCHEDULED UE TRANSITION TO CM-CONNECTED/RRC CONNECTED MODE IN 5GS

(71) Applicant: Telefonaktiebolaget LM Ericsson (publ), Stockholm (SE)

(72) Inventors: Qian Chen, Mölndal (SE); Paul Schliwa-Bertling, Ljungsbro (SE); Hans Bertil Rönneke, Kungsbacka (SE); Roland Gustafsson, Bengtsfors (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 17/056,515

(22) PCT Filed: May 15, 2019

(86) PCT No.: PCT/EP2019/062492
§ 371 (c)(1),
(2) Date: Nov. 18, 2020

(87) PCT Pub. No.: WO2019/219753
PCT Pub. Date: Nov. 21, 2019

(65) Prior Publication Data
US 2021/0219264 A1    Jul. 15, 2021

Related U.S. Application Data

(60) Provisional application No. 62/673,183, filed on May 18, 2018.

(51) Int. Cl.
*H04W 68/02* (2009.01)
*H04W 76/27* (2018.01)
*H04W 72/12* (2009.01)

(52) U.S. Cl.
CPC .......... *H04W 68/02* (2013.01); *H04W 72/12* (2013.01); *H04W 76/27* (2018.02)

(58) Field of Classification Search
CPC ..... H04W 68/00; H04W 68/02; H04W 72/12; H04W 76/27; H04W 8/18; H04W 60/06; H04W 68/005; H04W 8/08; H04W 88/02
See application file for complete search history.

(56) References Cited

U.S. PATENT DOCUMENTS 10,187,910 B2 * 1/2019 Kim ............... H04W 76/19
2018/0027521 A1   1/2018 Kim et al.
(Continued)

FOREIGN PATENT DOCUMENTS

GB       2592095 A  *  8/2021  ............ H04W 12/02
WO   WO-2016070936 A1 *  5/2016  ............ H04W 76/19
(Continued)

OTHER PUBLICATIONS

Author Unknown, "Technical Specification Group Services and System Aspects; Study on Cellular IoT support and evolution for the 5G system (Release 16)," Technical Report 23.724, Version 0.3.0, 3GPP Organizational Partners, Apr. 2018, 157 pages.
(Continued)

*Primary Examiner* — Dung Hong
(74) *Attorney, Agent, or Firm* — Withrow & Terranova, PLLC (57) ABSTRACT

Embodiments of a method performed by a radio access node for network scheduled User Equipment (UE) transition to connected mode and corresponding embodiments of a radio access node are disclosed. In some embodiments, a method performed by a radio access node comprises receiving: (a) a notification request from an Access and Mobility Management Function (AMF) to retrieve reachability information for a UE or (b) downlink data to be communicated to the UE.
(Continued)

The method further comprises, upon receiving either (a) or (b), determining that the UE is in an inactive state and is currently unreachable. The method further comprises sending information to the AMF that notifies the AMF that the UE is currently unreachable. The information comprises information that indicates that RAN paging of the UE is scheduled or scheduling assistance information. Embodiments of method performed by an AMF and corresponding embodiments of an AMF are also disclosed.

20 Claims, 8 Drawing Sheets

(56) References Cited

U.S. PATENT DOCUMENTS

| | | | |
|---|---|---|---|
| 2018/0103427 A1* | 4/2018 | Griot | H04W 76/40 |
| 2020/0120570 A1* | 4/2020 | Youn | H04W 76/11 |
| 2020/0178208 A1* | 6/2020 | Kim | H04W 76/27 |

FOREIGN PATENT DOCUMENTS

| | | | | |
|---|---|---|---|---|
| WO | 2017173158 A1 | 10/2017 | | |
| WO | WO-2017188758 A1 * | 11/2017 | | H04W 28/02 |
| WO | WO-2018057120 A1 * | 3/2018 | | H04W 76/20 |
| WO | WO-2019128622 A1 * | 7/2019 | | H04W 60/02 |

OTHER PUBLICATIONS

Author Unknown, "Technical Specification Group Services and System Aspects; Study on Cellular IoT support and evolution for the 5G system (Release 16)," Technical Report 23.724, Version 16.0.0, 3GPP Organizational Partners, Dec. 2018, 276 pages.

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

Author Unknown, "Technical Specification Group Services and System Aspects; Procedures for the 5G System; Stage 2 (Release 15)," Technical Specification 23.502, Version 15.1.0, 3GPP Organizational Partners, Mar. 2018, 285 pages.

Author Unknown, "Technical Specification Group Services and System Aspects; Architecture enhancements to facilitate communications with packet data networks and applications (Release 15)," Technical Specification 23.682, Version 15.4.0, 3GPP Organizational Partners, Mar. 2018, 124 pages.

Ericsson, "S2-183217: KI3: Solution for High latency communication," Third Generation Partnership Project (3GPP), SA WG2 Meeting #127, Apr. 16-20, 2018, 12 pages, Sanya, China.

-ricsson, "S2-187283: KI3: Paging of power saving UEs," Third Generation Partnership Project (3GPP), SA WG2 Meeting # 128, Jul. 2-6, 2018, 9 pages, Vilnius, Lithuania.

Qualcomm Incorporated et al., "S2-184043: Solution Key issue 3 (HLCom): Extended buffering at UPF of MT data for user plane," Third Generation Partnership Project (3GPP), SA WG2 Meeting #127, Apr. 16-20, 2018, 4 pages, Sanya, China.

International Search Report and Written Opinion for International Patent Application No. PCT/EP2019/062492, dated Sep. 5, 2019, 11 pages.

* cited by examiner

APPARATUSES AND METHODS FOR NETWORK SCHEDULED UE TRANSITION TO CM-CONNECTED/RRC CONNECTED MODE IN 5GS

This application is a 35 U.S.C. § 371 national phase filing of International Application No. PCT/EP2019/062492, filed May 15, 2019, which claims the benefit of U.S. Provisional Application No. 62/673,183, filed May 18, 2018, the disclosures of which are incorporated herein by reference in their entireties.

TECHNICAL FIELD

The present disclosure relates to network scheduled transition of a User Equipment (UE) to connected mode in a wireless communication network.

BACKGROUND

The Third Generation Partnership Project (3GPP) has started to study Internet of Things (IoT) support in the Fifth Generation (5G) system in Technical Report (TR) 23.724 [1]. High latency communication is one of the key issues that will be discussed.

Functions for high latency communication may be used to handle Mobile Terminated (MT) communication with User Equipment devices (UEs) being unreachable while using power saving functions and for coordinating the maximum latency between the application, the UE, and the network. "High latency" refers to the initial response time before normal exchange of packets is performed and may be further classified into shorter and longer latencies. That is, the time it takes before a UE has woken up from its power saving state and responded to the initial downlink packet(s).

In the Evolved Packet Core (EPC) (see Technical Specification (TS) 23.682 v15.4.0 [4]), high latency communication is handled by the following two mechanisms:

Extended buffering of downlink data in the network: The data is buffered until the UE wakes up from its power saving state and moves to Evolved Packet System (EPS) Connection Management (ECM) connected state (i.e., ECM-CONNECTED state), when the buffered downlink data is conveyed b the UE.

Notification procedures: An Application Function (AF) (i.e., Service Capability Server (SCS)/Application Server (AS)) may request notification when a UE wakes up or is expected to wake up from its power saving state, to send the downlink data to the UE when the UE becomes reachable.

Similar approaches may be considered for the 5G Core Network (5GC). Extended buffering is not recommended for UEs using very long sleep durations.

Regarding architectural requirements, in addition to the common requirements in clause 4 of TR 23.724 [1], the following architecture requirements are to be supported for high latency communication in the 5G system:

Send downlink data to UEs at the earliest possible opportunity when the UEs are applying power saving functions, followed by subsequent return to power saving state when the data has been delivered.

Coordination of the UE sleep duration between the application, the UE, and the network.

Provide the AF (i.e., SCS/AS) with UE status information (e.g., reachability notification or the time when the UE is expected to be reachable).

An architectural baseline is as follows:

5G system (5GS) enhanced with resource efficient buffering until the UE wakes up from its power saving state.

The buffered downlink data can be forwarded, if needed, between the network function instances that provide the buffering to avoid packet loss.

Support for UE status information related to power saving functions (e.g., UE reachability) reporting to SCS/AS.

The 5GS may receive parameters related to reachability and buffering via the Network Parameter Configuration Application Program Interface (API). Some open issues are as follows. The following issues are to be considered:

Study how to support high latency communication when power saving solutions are used in 5GS.

Study where downlink data can be buffered.

Study which monitoring events can be generated.

Study whether the 5GS should support obtaining Maximum Latency parameters from the UE via Non-Access Stratum (NAS) signaling.

Note that the key issue of high latency communication may have some dependencies to the key issues for power saving functions, infrequent small data communication, frequent small data communication, and Network Parameter Configuration API via Network Exposure Function (NEF).

It has been proposed in S2-183217 [5]/S2-184043 [6] that either notification (either normal UE monitoring based on UE reachability, or UE monitoring based on UE availability after Downlink Data Notification (DDN) failure) or extended buffering can be used as a solution to address the high latency communication issue. This is documented in TR 23.724 [1] as solution 24. There are also other solutions that introduce similar extended data buffering solutions which are documented in TR 23.724 as solutions 10, 11, and 25.

SUMMARY

Systems and methods are disclosed herein for network scheduled User Equipment (UE) transition to connected mode in a cellular communications network. Embodiments of a method performed by a radio access node are disclosed. In some embodiments, a method performed by a radio access node for network scheduled UE transition to connected mode in a cellular communications network comprises receiving either: (a) a notification request from an Access and Mobility Management Function (AMF) to retrieve reachability information for a UE or (b) downlink data to be communicated to the UE. The method further comprises, upon receiving either (a) or (b), determining that the UE is in an inactive state and is currently unreachable. The method further comprises sending information to the AMF that notifies the AMF that the UE is currently unreachable. The information comprises either one or both of: information that indicates that Radio Access Network (RAN) paging of the UE is scheduled and scheduling assistance information.

In some embodiments, the method further comprises paging the UE when the UE is reachable, the paging of the UE being either scheduled by the radio access node or triggered by the AMF.

In some embodiments, the information that notifies the AMF that the UE is currently unreachable comprises information that indicates that RAN paging of the UE is scheduled. In some embodiments, the method further comprises scheduling RAN paging of the UE at a time at which the UE will be reachable. In some embodiments, the time at which the UE will be reachable is a time at which the radio access node knows that the UE will be in a Radio Resource Control (RRC) connected state. In some other embodiments, the time at which the UE will be reachable is a next possible paging occasion for the UE. In some embodiments, the method further comprises paging the UE at the scheduled time. In some embodiments, the method further comprises, after paging the UE and after the UE has entered a connected mode, notifying the AMF that the UE is connected and reachable.

In some embodiments, the information that notifies the AMF that the UE is currently unreachable comprises information that indicates that the radio access node is relying on the AMF or some other core network function to trigger the UE to transition from the inactive state to connected state such that the UE is reachable. In some embodiments, the method further comprises receiving a communication from the AMF or some other core network node that triggers paging the UE, paging the UE upon receiving the communication, and notifying the AMF that the UE is connected and reachable after paging the UE and after the UE has entered a connected state.

In some embodiments, the information that notifies the AMF that the UE is currently unreachable comprises scheduling assistance information. In some embodiments, the scheduling assistance information comprises information that assists the AMF to schedule a request message to the radio access node to trigger RAN paging of the UE at a time at which the UE will be reachable. In some embodiments, the scheduling assistance information comprises information that indicates a time at which the UE will be reachable. In some embodiments, the method further comprises receiving a communication from the AMF or some other core network node that triggers paging the UE in accordance with the scheduling assistance information, paging the UE upon receiving the communication, and notifying the AMF that the UE is connected and reachable after paging the UE and after the UE has entered a connected mode. In some embodiments, the communication is a N2 request message.

Embodiments of a method performed by an AMF for network scheduled UE transition to connected mode in a cellular communications network are also disclosed. In some embodiments, a method performed by an AMF for network scheduled UE transition to connected mode in a cellular communications network comprises receiving, from a radio access node, information that notifies the AMF that a UE is currently unreachable. The information comprises either one or both of: information that indicates that RAN paging of the UE is scheduled and scheduling assistance information.

In some embodiments, the information that notifies the AMF that the UE is currently unreachable comprises information that indicates that RAN paging of the UE is scheduled. In some embodiments, the method further comprises, after RAN paging the UE and after the UE has entered a connected mode, receiving, from the radio access node, a notification that the UE is connected and reachable and notifying a Service Capability Server/Application Server (SCS/AS) that the UE is connected and reachable.

In some embodiments, the information that notifies the AMF that the UE is currently unreachable comprises information that indicates that the radio access node is relying on the AMF or some other core network function to trigger the UE to transition from an inactive state to a connected state such that the UE is reachable. In some embodiments, the method further comprises sending, to the radio access node, a communication that triggers paging the UE and receiving, from the radio access node, a notification that the UE is connected and reachable. In some embodiments, the method further comprises notifying an SCS/AS that the UE is connected and reachable.

In some embodiments, the information that notifies the AMF that the UE is currently unreachable comprises scheduling assistance information. In some embodiments, the scheduling assistance information comprises information that assists the AMF to schedule a request message to the radio access node to trigger RAN paging of the UE at a time at which the UE will be reachable. In some embodiments, the scheduling assistance information comprises information that indicates a time at which the UE will be reachable. In some embodiments, the method further comprises sending, to the radio access node, a communication that triggers paging the UE at a time at which the UE is reachable as indicated by the scheduling assistance information and receiving, from the radio access node, a notification that the UE is connected and reachable. In some embodiments, the communication is a N2 request message. In some embodiments, the method further comprises notifying an SCS/AS that the UE is connected and reachable.

Embodiments of a radio access node for network scheduled UE transition to connected mode in a cellular communications network are also disclosed. In some embodiments, a radio access node for network scheduled UE transition to connected mode in a cellular communications network is adapted to receive either: (a) a notification request from an AMF to retrieve reachability information for a UE or (b) downlink data to be communicated to the UE. The radio access node is further adapted to, upon receiving either (a) or (b), determine that the UE is in an inactive state and is currently unreachable. In some embodiments, the radio access node is further adapted to send information to the AMF that notifies the AMF that the UE is currently unreachable. The information comprises either one or both of: information that indicates that RAN paging of the UE is scheduled and scheduling assistance information.

In some embodiments, a radio access node for network scheduled UE transition to connected mode in a cellular communications network comprises a network interface and processing circuitry associated with the network interface. The processing circuitry is configured to cause the radio access node to receive either: (a) a notification request from an AMF to retrieve reachability information for a UE or (b) downlink data to be communicated to the UE. The processing circuitry is further configured to cause the radio access node to, upon receiving either (a) or (b), determine that the UE is in an inactive state and is currently unreachable. The processing circuitry is further configured to cause the radio access node to send information to the AMF that notifies the AMF that the UE is currently unreachable. The information comprises either one or both of: information that indicates that RAN paging of the UE is scheduled and scheduling assistance information.

In some embodiments, the processing circuitry is further configured to cause the radio access node to page the UE when the UE is reachable, the paging of the UE being either scheduled by the radio access node or triggered by the AMF.

In some embodiments, the information that notifies the AMF that the UE is currently unreachable comprises information that indicates that RAN paging of the UE is scheduled. In some embodiments, the processing circuitry is further configured to cause the radio access node to schedule RAN paging of the UE at a time at which the UE will be reachable. In some embodiments, the time at which the UE will be reachable is a next possible paging occasion for the UE. In some embodiments, the processing circuitry is further configured to cause the radio access node to page the UE at the scheduled time. In some embodiments, the processing circuitry is further configured to cause the radio access node to, after paging the UE and after the UE has entered a connected mode, notify the AMF that the UE is connected and reachable.

Embodiments of an AMF for network scheduled UE transition to connected mode in a cellular communications network are also disclosed. In some embodiments, an AMF for network scheduled UE transition to connected mode in a cellular communications network is adapted to receive, from a radio access node, information that notifies the AMF that a UE is currently unreachable. The information comprises either one or both of: information that indicates that RAN paging of the UE is scheduled and scheduling assistance information.

In some embodiments, an AMF for network scheduled UE transition to connected mode in a cellular communications network comprises a network interface and processing circuitry associated with the network interface. The processing circuitry is configured to cause the AMF to receive, from a radio access node, information that notifies the AMF that a UE is currently unreachable. The information comprises either one or both of: information that indicates that RAN paging of the UE is scheduled and scheduling assistance information.

In some embodiments, the information that notifies the AMF that the UE is currently unreachable comprises information that indicates that RAN paging of the UE is scheduled. In some embodiments, the processing circuitry is further configured to cause the AMF to, after RAN paging the UE and after the UE has entered a connected mode, receive, from the radio access node, a notification that the UE is connected and reachable and notify an SCS/AS that the UE is connected and reachable.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), an Access Management Function (AMF) (also referred to as an Access and Mobility Management Function (AMF)), a Session Management Function (SMF), a User Plane Function (UPF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the Radio Access Network (RAN) or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). As discussed in the Background, it has been proposed in S2-183217 [5]/S2-184043 [6] that either notification (either normal UE monitoring based on UE reachability, or UE monitoring based on UE availability after Downlink Data Notification (DDN) failure) or extended buffering can be used as a solution to address the high latency communication issue. This is documented in Technical Report (TR) 23.724 [1] as solution 24. There are also other solutions that introduce similar extended data buffering solutions which are documented in TR 23.724 as solutions 10, 11, and 25. In all of these solutions, it describes that when an AMF determines that the UE is not reachable, the AMF indicates to the other Network Function (NF) (e.g., SMF) that the UE is not reachable and also the "duration" information is provided. However, it does not provide any proactive logics in the core network or the RAN to trigger the UE to transition from Radio Resource Control (RRC) inactive mode to RRC connected mode.

Certain aspects of the present disclosure and their embodiments may provide solutions to the aforementioned or other challenges. In some embodiments, when the RAN (i.e., a radio access node) determines that the UE is in some power saving mode (e.g., when enhanced Discontinuous Reception (eDRX) is applied for a UE in RRC inactive state) and not reachable, the RAN (i.e., the radio access node) may schedule a RAN paging and perform the paging when UE is reachable after reporting not reachable to the AMF. Alternatively, when the RAN (i.e., the radio access node) determines that the UE is not reachable and reports this to the AMF, the RAN (i.e., the radio access node) can also indicate that the RAN is to rely on the core network (e.g., the AMF) to trigger the UE transition from RRC inactive to RRC connected. The RAN (i.e., the radio access node) may also provide schedule assistance information. The AMF schedules a N2 request, e.g. based on the schedule assistance information, where the N2 request will trigger RAN paging.

Certain embodiments may provide one or more of the following technical advantage(s). For example, the network can trigger a UE transition to RRC connected state when RRC inactive is applied for the UE in some power saving mode, instead of passively waiting for UE initiated transition to RRC Connected mode.

Figure 1:
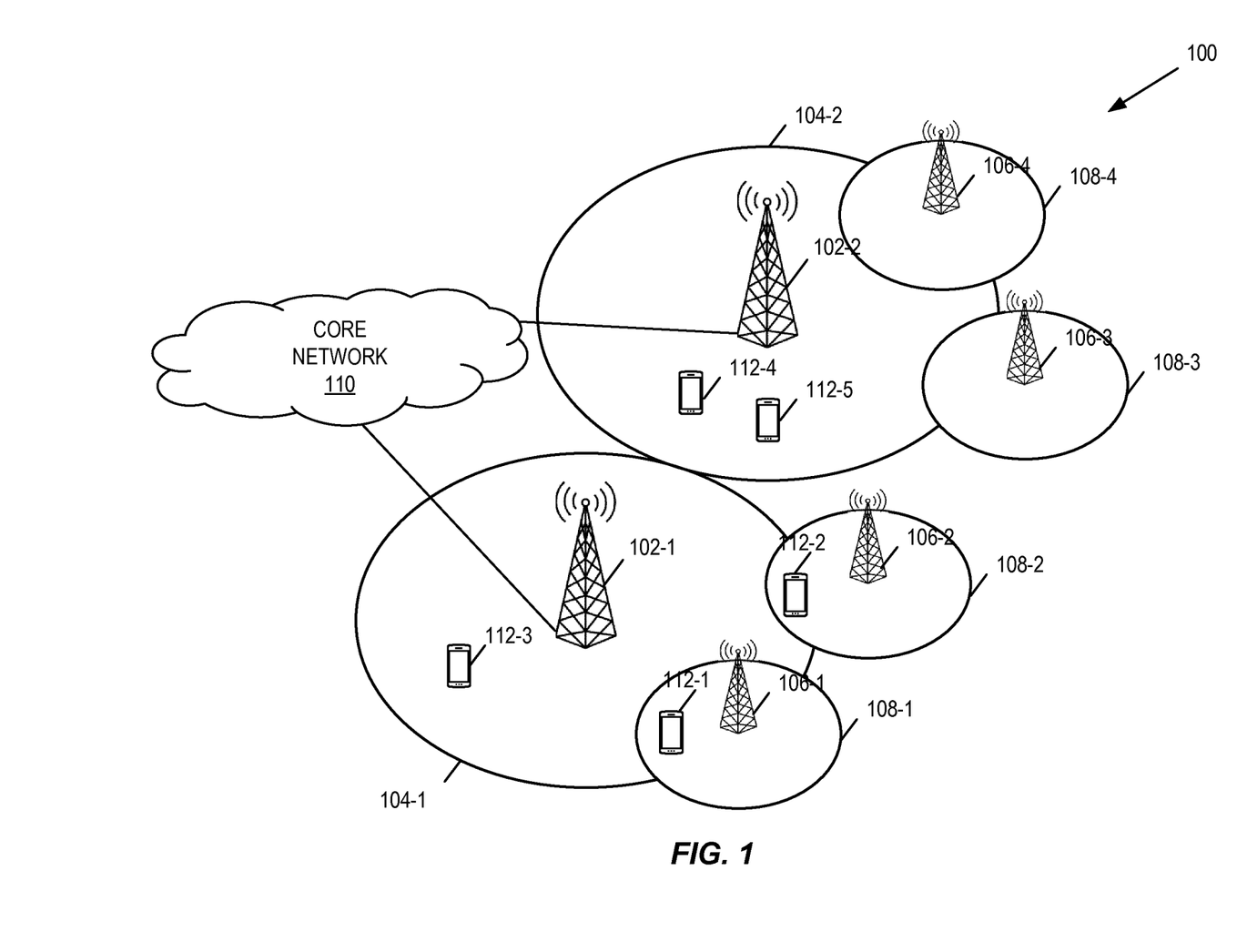
FIG. 1 illustrates one example of a cellular communications network in which embodiments of the present disclosure may be implemented.

In this regard, FIG. 1 illustrates one example of a cellular communications network 100 in which embodiments of the present disclosure may be implemented. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
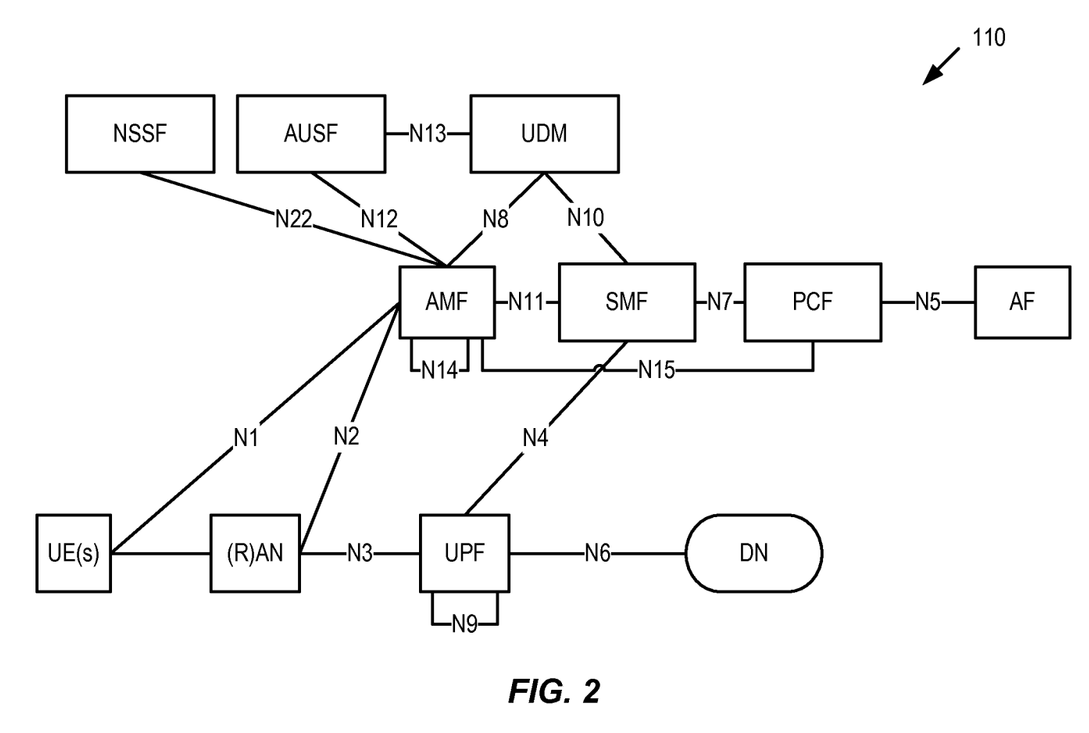
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core NFs, where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs connected to either a RAN or an Access Network (AN) as well as an AMF, also frequently denoted Access and Mobility Management Function. Typically, the R(AN) comprises base stations, e.g. such as eNBs or gNBs or similar. Seen from the core network side, the 5G core NFs shown in FIG. 2 include a Network Slice Selection Function (NSSF), an Authentication Server Function (AUSF), a Unified Data Management (UDM), an AMF, an SMF, a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G Core Network (5GC) aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
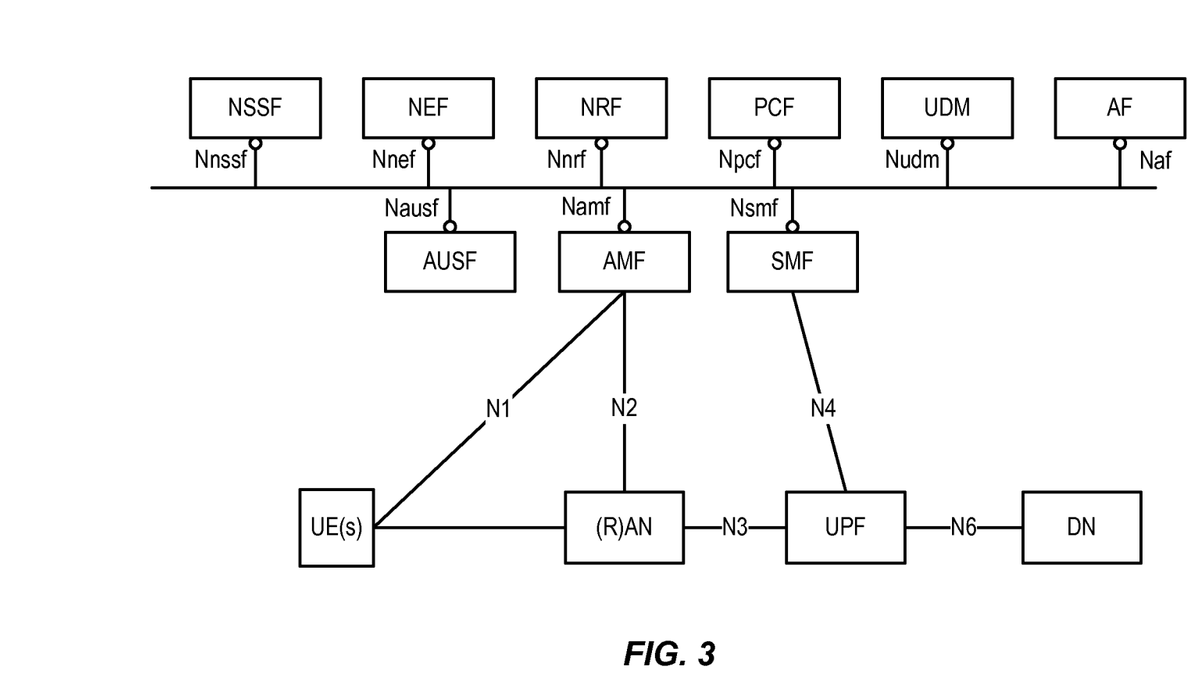
FIG. 3 illustrates a 5G network architecture using service-based interfaces between the NFs in the control plane.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF, etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5GC, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In some embodiments, when the RAN (i.e., a radio access node) determines that the UE is in some power saving mode (e.g., when eDRX is applied for a UE in RRC inactive state) and not reachable, the RAN (i.e., the radio access node) may schedule a RAN paging and perform the paging when the UE is reachable after reporting not reachable to AMF. Alternatively, when the RAN (i.e., the radio access node) determines that the UE is not reachable and reports this to the AMF, the RAN (i.e., the radio access node) can also indicate that the RAN is rely on the core network (e.g., the AMF) to trigger the UE transition from RRC inactive to RRC connected. The RAN (i.e., the radio access node) may also provide schedule assistance information. In some embodiments, the scheduling assistance information includes information that assists the AMF to schedule a request message to the radio access node to trigger RAN paging of the UE at a time at which the UE will be reachable. In some embodiments, the scheduling assistance information includes information that indicates a time at which the UE will be reachable. In some embodiments, the scheduling assistance information includes information that indicates when a next possible paging occasion for the UE will occur. The AMF schedules a N2 request, e.g. based on the schedule assistance information, where the N2 request will trigger RAN paging.

Figure 4:
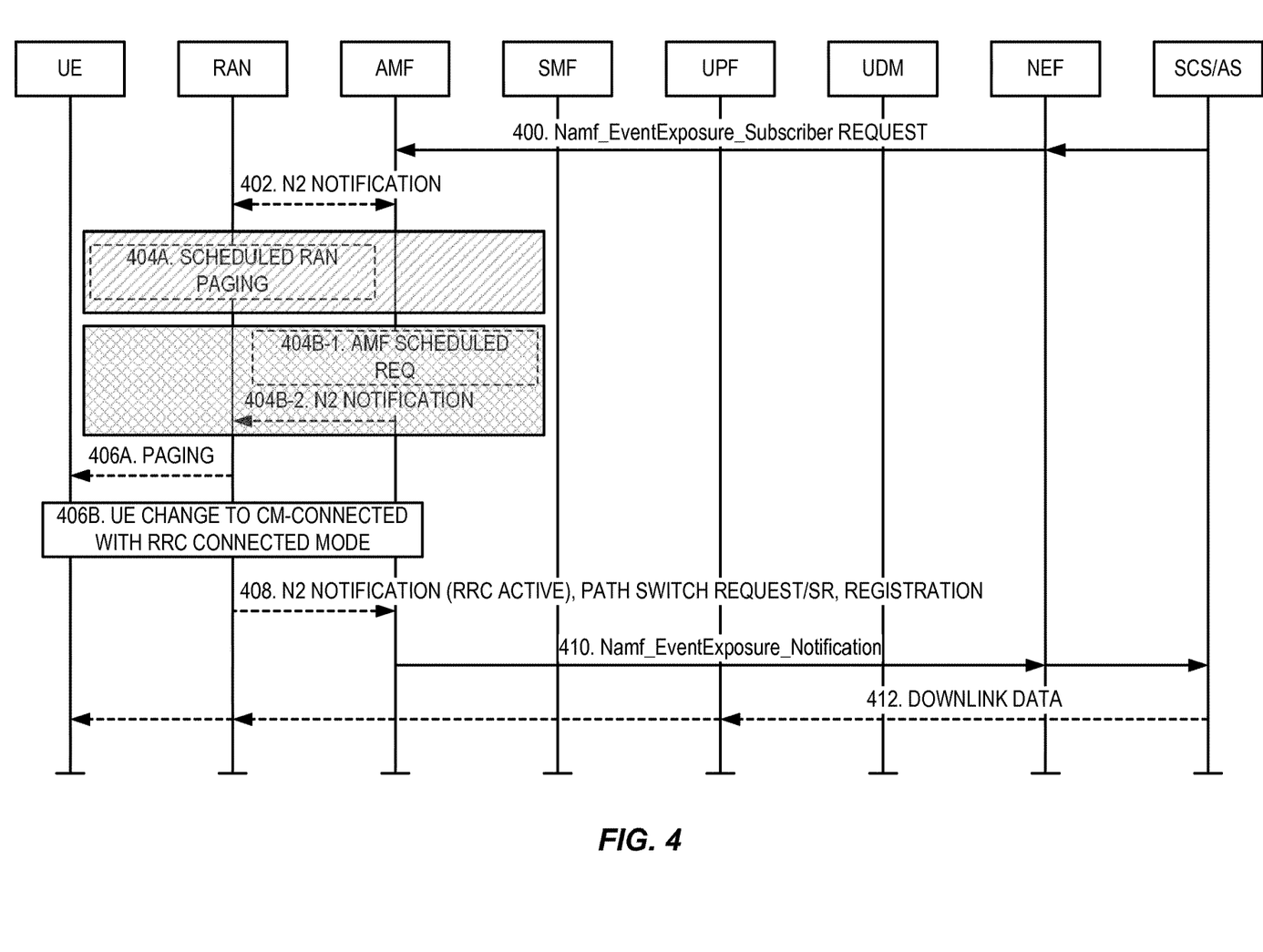
FIG. 4 illustrates a procedure for network scheduled transition for "normal notification of User Equipment (UE) reachability" in accordance with some embodiments of the present disclosure.
Figure 5:
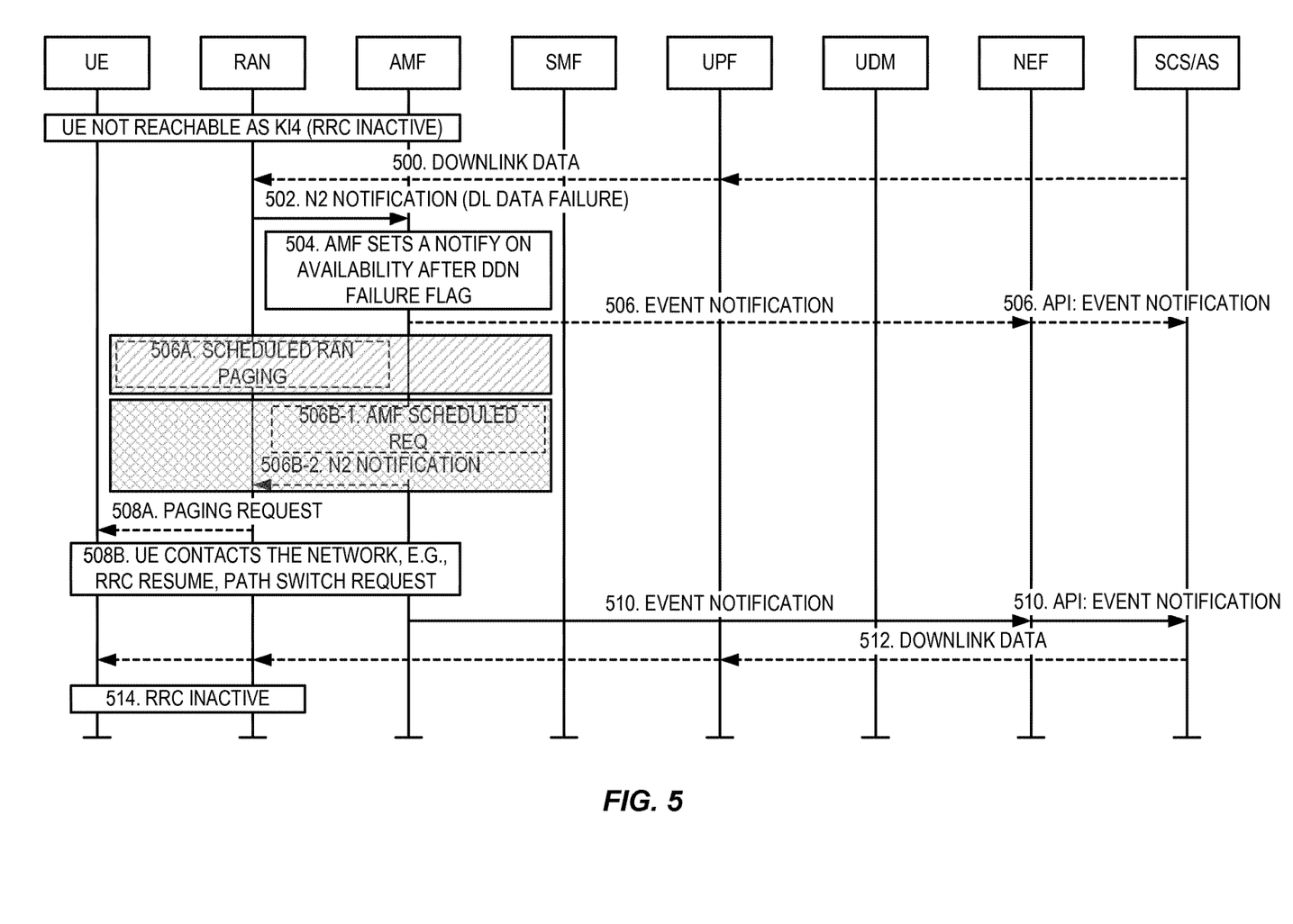
FIG. 5 illustrates a procedure for a network scheduled transition for "UE availability notification after Downlink Data Notification (DDN) failure" in accordance with some embodiments of the present disclosure.
Figure 6:
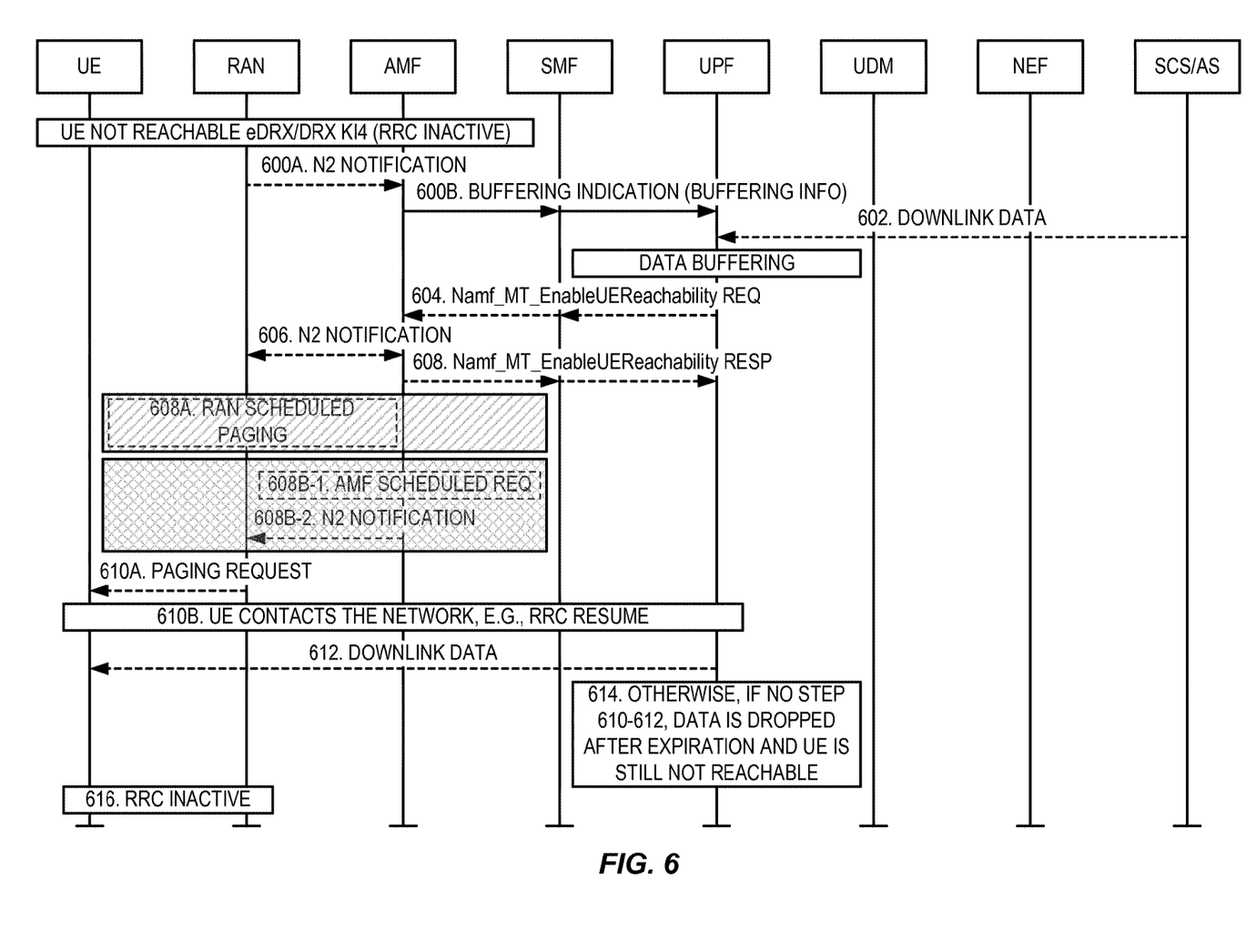
FIG. 6 illustrates a procedure for network scheduled transition for "extended data buffering" in accordance with some embodiments of the present disclosure.

FIGS. 4, 5, and 6 illustrate example procedures in which embodiments of the present disclosure can be implemented. Note, however, that these procedures are examples. Embodiments of the present disclosure may be implemented in any suitable procedure.

FIG. 4 illustrates a procedure for network scheduled transition for "normal notification of UE reachability" in accordance with some embodiments of the present disclosure. FIG. 4 illustrates event subscription and notification for UE reachability. The process of FIG. 4 includes:

Step 400: AF (i.e., Service Capability Server (SCS)/Application Server (AS)) subscribes to the AMF for a UE reachability report through Namf_EventExposure_Scubscriber Request service operation, when there is pending downlink data towards the UE.

Step 402: If the UE is in Connection Management (CM) connected state and RRC state is unknown, the AMF sends a N2 Notification Request to the RAN (i.e., to a radio access node) to retrieve UE reachability information. If the UE is in RRC inactive state and not currently reachable, the RAN responds back to the AMF indicating the UE is not reachable. The RAN can also indicate if RAN paging is scheduled. The RAN may provide scheduling assistance information to the AMF if paging is not scheduled.

Step 404A: If supported, the RAN schedules the RAN paging for a time at which the UE will be reachable (e.g., a next possible paging occasion for the UE). The RAN marks that AMF is to be notified when UE contacts network next time.

Step 404B: If the RAN does not support scheduled paging, the AMF can schedule a N2 request message (step 404B-1), taking scheduling assistance information received from the RAN into consideration, if there is any, and send the N2 request message to the RAN (step 404B-2). The N2 request message is a N2 request message that will trigger RAN paging of the UE. Note: the N2 request message that can trigger the RAN paging can either be a N2 notification or a Location Report procedure or a new message, or any other message can trigger RAN paging.

Steps 406A and 406B: The RAN performs paging (either scheduled RAN paging or paging triggered by the AMF N2 request) if the UE is still in RRC inactive state. UE enters CM-CONNECTED RRC Connected mode either due to a UE triggered procedure before the RAN scheduled paging or as a response to RAN scheduled paging.

Step 408: The RAN reports to the AMF that the UE is RRC connected and reachable.

Step 410: The AMF notifies the AF that the UE is reachable through a N2 notification procedure, or Path Switch Request.

Step 412: The AF sends downlink data to the UE.

FIG. 5 illustrates a procedure for a network scheduled transition for "UE availability notification after DDN failure" in accordance with some embodiments of the present disclosure. FIG. 5 illustrates notification—availability notification after DDN failure (CM-Connected/RRC-Inactive). The process of FIG. 5 includes the following:

Step 500: The application sends downlink data to the UPF/RAN.

Step 502: The RAN (i.e., the radio access node) checks the UE reachability in RRC_Inactive mode. If the UE is not reachable, i.e. due to KI4 (such as eDRX) or RAN paging fails, the RAN sends a N2 Notification to indicate the failure. The RAN can also indicate if RAN paging is scheduled. The RAN may provide scheduling assistance information to the AMF if paging is not scheduled.

Step 504: The AMF sets the "Notify on availability after DDN failure" flag.

Step 506: The AMF may optionally send an event notification to the NEF and SCS/AS as a confirmation that the downlink data in step 500 was received and that an 'Availability after DDN failure' notification will be sent as soon as the UE becomes available.

Step 506A: If supported, the RAN schedules the RAN paging as indicated in step 502 above. The RAN marks that the AMF is to be notified when UE contacts the network next time.

Step 506B: If the RAN does not support scheduling RAN paging, the AMF can schedule a N2 Request (step 506B-1), taking scheduling assistance information into consideration, if there is any, and send the N2 Request (step 506B-2). The N2 Request is a request that will trigger RAN paging of the UE. Note: the N2 request message that can trigger the RAN paging can either be a N2 notification or a Location Report procedure or any new message, or any other message can trigger RAN paging.

Steps 508A and 508B: The RAN performs paging (either scheduled RAN paging or paging triggered by the AMF N2 request) if the UE is still in RRC inactive state, and the UE enters CM-CONNECTED and RRC connected mode (the RAN notifies the AMF either through a N2 notification in case same RAN node, or a Path Switch Request in case of RAN node change) either due to RAN paging, or UE triggered signaling. The AMF notes that the UE is available and that the Notify-on-availability-after-DDN-failure flag for the UE is set (by step 504).

Step 510: The AMF clears the Notify-on-availability-after-DDN-failure flag for the UE and sends a Namf_EventExposure_Notification towards the NEF/Application.

Step 512: The application realizes the UE is reachable and re-sends downlink data.

Step 514: The RAN moves the UE to RRC Inactive state.

FIG. 6 illustrates a procedure for network scheduled transition for "extended data buffering" in accordance with some embodiments of the present disclosure. FIG. 6 illustrates data buffering in the SMF/UPF for RRC Inactive mode. The process of FIG. 6 includes:

Step 600: Data buffering is established, either:

Step 600A: Each time when the RAN (i.e., the radio access node) transitions a UE using eDRX/Discontinuous Reception (DRX) to RRC_Inactive state, the RAN sends a N2 Notification to the AMF. The RAN provides buffering support information if there is any, and (or)

Step 600B: Initially when the PDU Session is moved to CM-CONNECTED and RRC Active/Inactive are used, the AMF notifies the SMF/UPF that the PDU session is subject for extended data buffering and buffering support information (e.g., buffering indicator and optionally duration) based on known information (e.g., negotiated eDRX/DRX interval) and/or buffering supporting information from the RAN. The message used by the AMF can be the existing Nsmf_PDUSession_UpdateSMContext service, or Namf_EventExpousre_Notify, or any new service to deliver the information. If data is buffered in the UPF and not in the SMF, the SMF can notify the UPF in a similar way as in CM-IDLE mode.

Step 602: The application sends downlink data to the UPF, and the UPF will start to apply extended data buffering based on the indication received in step 600 above, e.g., using the buffering information for the extended buffering.

Step 604: [conditional] The SMF may either request the UE reachability report via Namf_MT_EnableUEReachability, based on a notification from the UPF which can either be similar to the DDN in CM-IDLE mode or a modification of the existing DDN message.

The SMF may optionally just wait for the next Mobile Originating (MO) data from the UE in steps 610A and 610B to trigger the sending of downlink data without invoking enabling the UE reachability reporting above.

Step 606: The AMF may use the N2 Notification procedure to retrieve the UE reachability information. The RAN may provide new buffering support information, if there is any. The RAN also indicates if RAN paging is scheduled if the UE current state is RRC inactive and not reachable. The RAN may provide scheduling assistant information to the AMF if paging is not scheduled.

Step 608: The AMF notifies the SMF/UPF with the latest reachability information (either the UE is reachable or still not reachable with new buffering support information).

Step 608A: The RAN may schedule the RAN paging as indicated in step 606 above. The RAN marks that the AMF is to be notified when UE contacts the network next time.

Step 608B: If the RAN does not support scheduling RAN paging, the AMF can schedule a N2 Request (taking scheduling assistant information into consideration if there is any) (step 608B-1) and send the N2 Request as scheduled (step 608B-2), which will trigger the RAN paging. Note: the N2 request message that can trigger the RAN paging can either be a N2 notification or a Location Report procedure or any new message.

Steps 610A and 610B: The RAN performs paging (either scheduled RAN paging or paging triggered by AMF N2 request) if the UE is still in RRC inactive state. When the UE enters CM-Connected and RRC Connected mode, the RAN notifies the AMF through a N2 notification triggered by a RRC resume, or an N2 Path Switch Request if a RRC resume triggers a RAN node change. The AMF in turn notifies the SMF/UPF of the UE reachability.

Step 612: The UPF thus can deliver buffered downlink data to the UE.

Step 614: If the UE does not contact with the network before expiry of the timer set in the SMF/UPF for the extended buffering duration, the buffered data is discarded in the SMF/UPF.

Step 616: The RAN moves the UE to RRC Inactive state.

Figure 7:
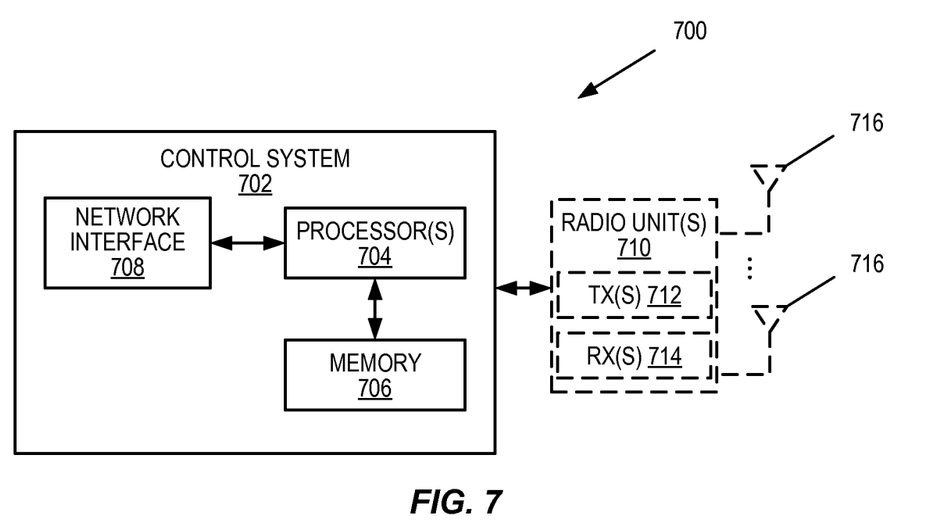
FIGS. 7 through 9 illustrate example embodiments of a network node in which embodiments of the present disclosure may be implemented.

FIG. 7 is a schematic block diagram of a network node 700 according to some embodiments of the present disclosure. The network node 700 may be, for example, a radio access node (e.g., a base station 102 or 106) or a network node implementing a core network function (e.g., an AMF, SMF, or the like). As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry.

In addition, in embodiments in which the network node 700 is a radio access node, the radio access node includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702.

The one or more processors 704 operate to provide one or more functions of a network node (e.g., a radio access node or a network node implementing a core network function) as described herein. In some embodiments, the function(s) are implemented in software that is stored, e.g., in the memory 706 and executed by the one or more processors 704.

Figure 8:
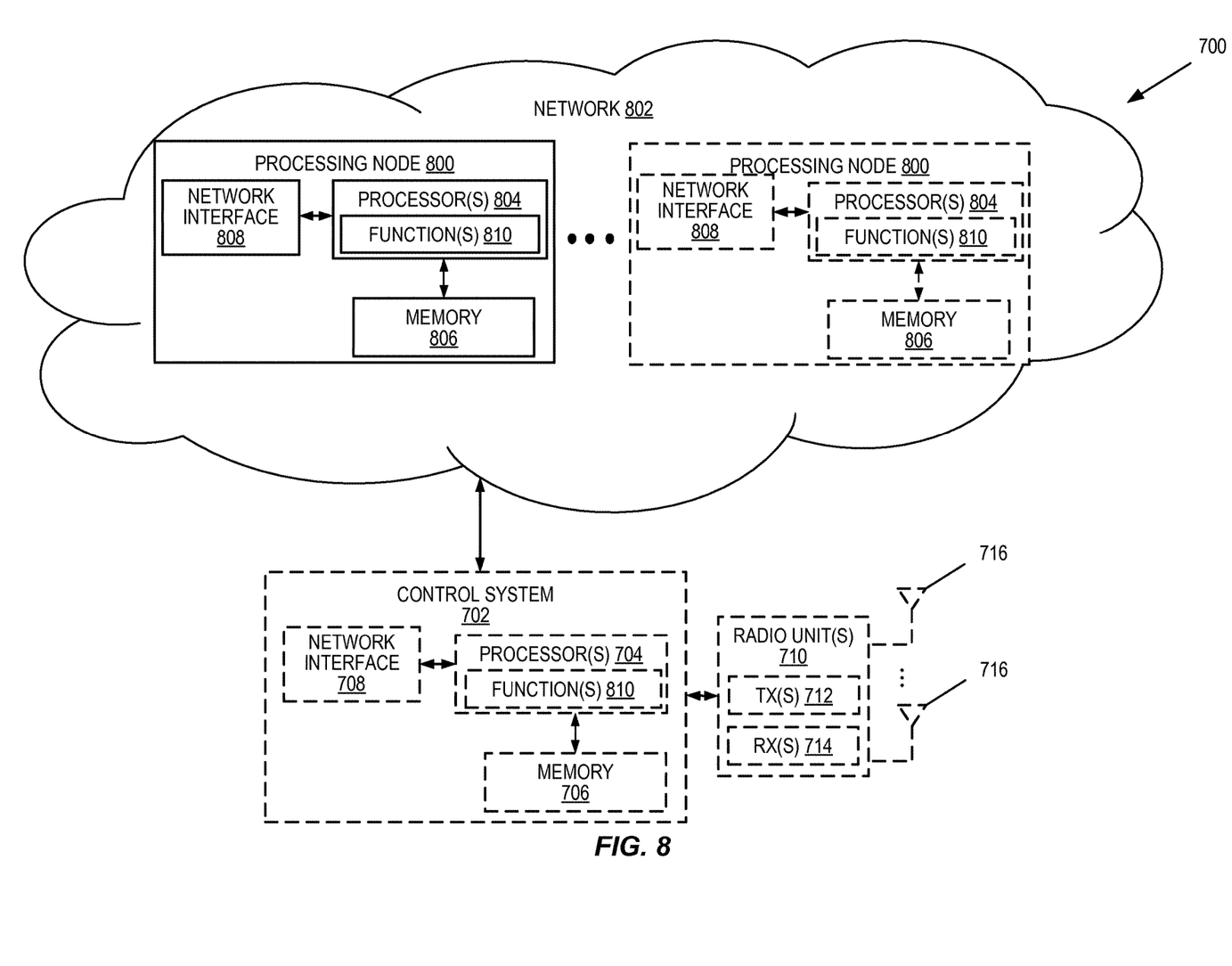

FIG. 8 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes the control system 702 that includes the one or more processors 704 (e.g., CPUs, ASICs, FPGAs, and/or the like), the memory 706, and the network interface 708.

Also, in embodiments in which the network node 700 is a radio access node, the radio access node further includes the one or more radio units 710 that each includes the one or more transmitters 712 and the one or more receivers 714 coupled to the one or more antennas 716, as described above. The control system 702 is connected to the radio unit(s) 710 via, for example, an optical cable or the like. The control system 702 is connected to one or more processing nodes 800 coupled to or included as part of a network(s) 802 via the network interface 708.

Each processing node 800 includes one or more processors 804 (e.g., CPUs, ASICs, FPGAs, and/or the like), memory 806, and a network interface 808.

In this example, functions 810 of the network node 700 (e.g., functions of a radio access node or a network node implementing a core network function) described herein are implemented at the one or more processing nodes 800 or distributed across the control system 702 and the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
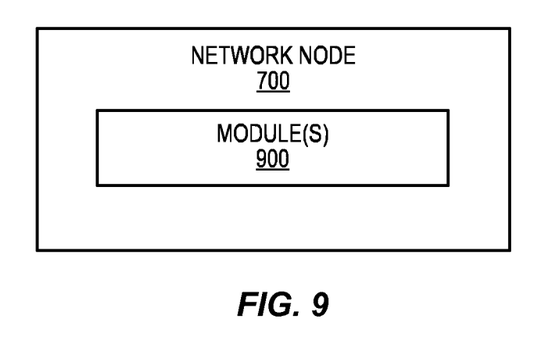

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are:

Embodiment 1: A method performed by a radio access node for network scheduled User Equipment, UE, transition to connected mode in a cellular communications network, the method comprising:

receiving either: (a) a notification request from an Access Management Function, AMF, to retrieve reachability information for a UE or (b) downlink data to be communicated to the UE;

upon receiving either (a) or (b), determining that the UE is in an inactive state and is currently unreachable; and sending information to the AMF that notifies the AMF that the UE is currently unreachable, the information comprising:

information that indicates that Radio Access Network, RAN, paging of the UE is scheduled;

information that indicates that the radio access node is relying on the AMF or some other core network function to trigger the UE to transition from the inactive state to an active state such that the UE is reachable; and/or scheduling assistance information.

Embodiment 2: The method of embodiment 1 wherein the information comprises information that indicates that RAN paging of the UE is scheduled.

Embodiment 3: The method of embodiment 2 further comprising scheduling RAN paging of the UE at a time at which the UE will be reachable.

Embodiment 4: The method of embodiment 3 wherein the time at which the UE will be reachable is a time at which the radio access node knows that the UE will be in a Radio Resource Control, RRC, connected state.

Embodiment 5: The method of embodiment 3 wherein the time at which the UE will be reachable is a next possible paging occasion for the UE.

Embodiment 6: The method of any one of embodiments 3 to 5 further comprising paging the UE at the scheduled time.

Embodiment 7: The method of embodiment 6 further comprising, after paging the UE and after the UE has entered a connected mode, notifying the AMF that the UE is connected and reachable.

Embodiment 8: The method of embodiment 1 wherein the information comprises the information that indicates that the radio access node is relying on the AMF or some other core network function to trigger the UE to transition from the inactive state to connected state such that the UE is reachable.

Embodiment 9: The method of embodiment 8 further comprising:

receiving a communication from the AMF or some other core network node that triggers paging the UE;

upon receiving the communication, paging the UE; and after paging the UE and after the UE has entered a connected state, notifying the AMF that the UE is connected and reachable.

Embodiment 10: The method of embodiment 1 wherein the information comprises the scheduling assistance information.

Embodiment 11: The method of embodiment 10 wherein the scheduling assistance information comprises information that assists the AMF to schedule a request message to the radio access node to trigger RAN paging of the UE at a time at which the UE will be reachable.

Embodiment 12: The method of embodiment 10 wherein the scheduling assistance information comprises information that indicates a time at which the UE will be reachable.

Embodiment 13: The method of any one of embodiments 10 to 12 further comprising:

receiving a communication from the AMF or some other core network node that triggers paging the UE in accordance with the scheduling assistance information;

upon receiving the communication, paging the UE; and after paging the UE and after the UE has entered a connected mode, notifying the AMF that the UE is connected and reachable.

Embodiment 14: The method of embodiment 13 wherein the communication is a N2 request message.

Embodiment 15: A method performed by a core network function for network scheduled User Equipment, UE, transition to connected mode in a cellular communications network, the method comprising:

receiving, from a radio access node, information that notifies the core network function that a UE is currently unreachable, the information comprising:

information that indicates that Radio Access Network, RAN, paging of the UE is scheduled;

information that indicates that the radio access node is relying on an Access Management Function, AMF, or some other core network function to trigger the UE to transition from an inactive state to an active state such that the UE is reachable; and/or scheduling assistance information.

Embodiment 16: The method of embodiment 15 wherein the information comprises information that indicates that RAN paging of the UE is scheduled.

Embodiment 17: The method of embodiment 16 further comprising, after RAN paging the UE and after the UE has entered a connected mode:

receiving, from the radio access node, a notification that the UE is connected and reachable; and notifying a Service Capability Server/Application Server, SCS/AS, that the UE is connected and reachable.

Embodiment 18: The method of embodiment 15 wherein the information comprises the information that indicates that the radio access node is relying on the AMF or some other core network function to trigger the UE to transition from an inactive state to an connected state such that the UE is reachable.

Embodiment 19: The method of embodiment 18 further comprising:

sending, to the radio access node, a communication that triggers paging the UE; and receiving, from the radio access node, a notification that the UE is connected and reachable.

Embodiment 20: The method of embodiment 19 further comprising notifying a Service Capability Server/Application Server, SCS/AS, that the UE is connected and reachable.

Embodiment 21: The method of embodiment 15 wherein the information comprises the scheduling assistance information.

Embodiment 22: The method of embodiment 21 wherein the scheduling assistance information comprises information that assists the AMF to schedule a request message to the radio access node to trigger RAN paging of the UE at a time at which the UE will be reachable.

Embodiment 23: The method of embodiment 21 wherein the scheduling assistance information comprises information that indicates a time at which the UE will be reachable.

Embodiment 24: The method of any one of embodiments 21 to 23 further comprising:

sending, to the radio access node, a communication that triggers paging the UE at a time at which the UE is reachable as indicated by the scheduling assistance information; and receiving, from the radio access node, a notification that the UE is connected and reachable.

Embodiment 25: The method of embodiment 24 wherein the communication is a N2 request message.

Embodiment 26: The method of embodiment 24 or 25 further comprising notifying a Service Capability Server/Application Server, SCS/AS, that the UE is connected and reachable.

Embodiment 27: A network function for a core network of a cellular communications system, the network function adapted to perform the method of any one of embodiments 1 to 26.

Embodiment 28: A processing node hosting a network function for a core network of a cellular communications system, the processing node comprising:

at least one processor; and memory comprising instructions executable by the at least one processor whereby the processing node is operable to provide the network function and where the network function is operable to perform the method of any one of embodiments 1 to 26.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core Network
5GS Fifth Generation System
AF Application Function
AN Access Network
AMF Access Management Function/Access and Mobility Management Function
API Application Program Interface
AS Application Server
ASIC Application Specific Integrated Circuit
AUSF Authentication Server Function
CM Connection Management
CPU Central Processing Unit
DDN Downlink Data Notification
DN Data Network
DRX Discontinuous Reception
ECM Evolved Packet System Connection Management
eDRX Enhanced Discontinuous Reception
eNB Enhanced or Evolved Node B
EPC Evolved Packet Core
EPS Evolved Packet System
FPGA Field Programmable Gate Array
gNB New Radio Base Station
IoT Internet of Things
IP Internet Protocol
LTE Long Term Evolution
MME Mobility Management Entity
MO Mobile Originating
MT Mobile Terminated
MTC Machine Type Communication
NAS Non-Access Stratum
NEF Network Exposure Function
NF Network Function
NR New Radio
NRF Network Repository Function
NSSF Network Slice Selection Function
PCF Policy Control Function
P-GW Packet Data Network Gateway
QoS Quality of Service
RAN Radio Access Network
RRC Radio Resource Control
RRH Remote Radio Head
RTT Round Trip Time
SCEF Service Capability Exposure Function
SCS Service Capability Server
SMF Session Management Function
TR Technical Report
TS Technical Specification
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

REFERENCES

[1] 3GPP TR 23.724 v0.3.0
[2] 3GPP TS 23.501 v15.1.0
[3] 3GPP TS 23.502 v15.1.0
[4] 3GPP TS 23.682 v15.4.0
[5] Ericsson, "S2-183217: KI3: Solution for High latency communication," SA WG2 Meeting #127, Apr. 16-20, 2018, Sanya, China
[6] Qualcomm et al., "S2-184043: Solution Key issue 3 (HLCom): Extended buffering at UPF of MT data for user plane," SA WG2 Meeting #127, Apr. 16-20, 2018, Sanya, China

What is claimed is:

1. A method performed by a radio access node for network scheduled User Equipment, UE, transition to connected mode in a cellular communications network, the method comprising:
receiving either: (a) a notification request from an Access and Mobility Management Function, AMF, to retrieve reachability information for a UE or (b) downlink data to be communicated to the UE;
upon receiving either (a) or (b), determining that the UE is in an inactive state and is currently unreachable; and
sending information to the AMF that notifies the AMF that the UE is currently unreachable, the information comprising at least one of:
information that indicates that Radio Access Network, RAN, paging of the UE is scheduled; and
scheduling assistance information.

2. The method of claim 1 further comprising paging the UE when the UE is reachable, the paging of the UE being either scheduled by the radio access node or triggered by the AMF.

3. The method of claim 1 wherein the information that notifies the AMF that the UE is currently unreachable comprises information that indicates that Radio Access Network, RAN, paging of the UE is scheduled.

4. The method of claim 3 further comprising scheduling RAN paging of the UE at a time at which the UE will be reachable.

5. The method of claim 4 wherein the time at which the UE will be reachable is a time at which the radio access node knows that the UE will be in a Radio Resource Control, RRC, connected state.

6. The method of claim 4 wherein the time at which the UE will be reachable is a next possible paging occasion for the UE.

7. The method of claim 4 further comprising paging the UE at the scheduled time.

8. The method of claim 7 further comprising, after paging the UE and after the UE has entered a connected mode, notifying the AMF that the UE is connected and reachable.

9. The method of claim 1 wherein the information that notifies the AMF that the UE is currently unreachable comprises information that indicates that the radio access node is relying on the AMF or some other core network function to trigger the UE to transition from the inactive state to connected state such that the UE is reachable.

10. The method of claim 9 further comprising:
receiving a communication from the AMF or some other core network node that triggers paging the UE;
upon receiving the communication, paging the UE; and
after paging the UE and after the UE has entered a connected state, notifying the AMF that the UE is connected and reachable.

11. The method of claim 1 wherein the information that notifies the AMF that the UE is currently unreachable comprises scheduling assistance information.

12. The method of claim 11 wherein the scheduling assistance information comprises information that assists the AMF to schedule a request message to the radio access node to trigger RAN paging of the UE at a time at which the UE will be reachable.

13. The method of claim 11 wherein the scheduling assistance information comprises information that indicates a time at which the UE will be reachable.

14. A method performed by an Access and Mobility Management Function, AMF, for network scheduled User Equipment, UE, transition to connected mode in a cellular communications network, the method comprising:
   receiving, from a radio access node, information that notifies the AMF that a UE is currently unreachable, the information comprising at least one of:
      information that indicates that Radio Access Network, RAN, paging of the UE is scheduled; and
      scheduling assistance information.

15. The method of claim 14 wherein the information that notifies the AMF that the UE is currently unreachable comprises information that indicates that RAN paging of the UE is scheduled.

16. The method of claim 15 further comprising, after RAN paging the UE and after the UE has entered a connected mode:
   receiving, from the radio access node, a notification that the UE is connected and reachable; and
   notifying a Service Capability Server/Application Server, SCS/AS, that the UE is connected and reachable.

17. The method of claim 14 wherein the information that notifies the AMF that the UE is currently unreachable comprises information that indicates that the radio access node is relying on the AMF or some other core network function to trigger the UE to transition from an inactive state to a connected state such that the UE is reachable.

18. The method of claim 17 further comprising:
   sending, to the radio access node, a communication that triggers paging the UE; and
   receiving, from the radio access node, a notification that the UE is connected and reachable.

19. A radio access node for network scheduled User Equipment, UE, transition to connected mode in a cellular communications network, the radio access node comprises:
   a network interface; and
   processing circuitry associated with the network interface, the processing circuitry configured to cause the radio access node to:
      receive either: (a) a notification request from an Access and Mobility Management Function, AMF, to retrieve reachability information for a UE or (b) downlink data to be communicated to the UE;
      upon receiving either (a) or (b), determine that the UE is in an inactive state and is currently unreachable; and
      send information to the AMF that notifies the AMF that the UE is currently unreachable, the information comprising at least one of:
         information that indicates that Radio Access Network, RAN, paging of the UE is scheduled; and
         scheduling assistance information.

20. An Access and Mobility Management Function, AMF, for network scheduled User Equipment, UE, transition to connected mode in a cellular communications network, the AMF comprises:
   a network interface; and
   processing circuitry associated with the network interface, the processing circuitry configured to cause the AMF to:
      receive, from a radio access node, information that notifies the AMF that a UE is currently unreachable, the information comprising at least one of:
         information that indicates that Radio Access Network, RAN, paging of the UE is scheduled; and
         scheduling assistance information.

* * * * *